United States Patent
Elend et al.

(10) Patent No.: US 12,438,746 B2
(45) Date of Patent: Oct. 7, 2025

(54) CONTROLLER AREA NETWORK MODULE AND A METHOD FOR THE CAN MODULE

(71) Applicant: NXP B.V., Eindhoven (NL)

(72) Inventors: Bernd Uwe Gerhard Elend, Hamburg (DE); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/637,786

(22) Filed: Apr. 17, 2024

(65) Prior Publication Data

US 2024/0356775 A1 Oct. 24, 2024

(30) Foreign Application Priority Data

Apr. 18, 2023 (EP) ..................................... 23168569

(51) Int. Cl.
*H04L 12/40* (2006.01)
*H04L 12/403* (2006.01)

(52) U.S. Cl.
CPC ...... *H04L 12/40078* (2013.01); *H04L 12/403* (2013.01); *H04L 2012/40215* (2013.01)

(58) Field of Classification Search
CPC ............. H04L 12/40078; H04L 12/403; H04L 2012/40215
See application file for complete search history.

(56) References Cited

U.S. PATENT DOCUMENTS

| | | | |
|---|---|---|---|
| 7,017,072 B1 * | 3/2006 | Barrenscheen | H04L 69/40 714/4.2 |
| 9,054,851 B2 * | 6/2015 | Bowling | H04L 7/0079 |
| 11,196,585 B1 * | 12/2021 | Auerbach | H04L 12/40013 |
| 11,422,962 B2 * | 8/2022 | Green | H04L 12/40195 |
| 11,502,876 B2 * | 11/2022 | Walker | H04L 12/4135 |
| 11,722,327 B2 * | 8/2023 | Muth | H04L 25/0278 370/438 |
| 11,831,466 B2 * | 11/2023 | Mutter | H04L 12/407 |
| 12,284,053 B2 * | 4/2025 | Stegemann | H04L 12/40032 |
| 12,314,203 B2 * | 5/2025 | Seemann | G06F 13/4004 |
| 2014/0215109 A1 * | 7/2014 | Hopfner | G06F 13/4072 710/105 |
| 2015/0095711 A1 * | 4/2015 | Elend | H04L 12/4135 714/39 |

(Continued)

FOREIGN PATENT DOCUMENTS

| | | |
|---|---|---|
| CN | 113949116 A | 1/2022 |
| EP | 2940935 A1 | 11/2015 |

(Continued)

OTHER PUBLICATIONS

ISO 11898-1; 65 pages (Dec. 2015).
Notice of Allowance; U.S. Appl. No. 18/638,086; 19 pages (Jun. 6, 2025).

*Primary Examiner* — Henry Tsai
*Assistant Examiner* — Christopher A Daley

(57) ABSTRACT

The present disclosure relates to a CAN controller module. The CAN controller module is configured to detect transmission errors during transmissions of bits of a CAN frame via a CAN but and to handle these transmission errors robustly such that a high transmission rate is possible even if the transmission errors occur. The present disclosure also relates to a method for the CAN controller module.

20 Claims, 8 Drawing Sheets

(56) References Cited

U.S. PATENT DOCUMENTS

| | | | |
|---|---|---|---|
| 2015/0312052 A1* | 10/2015 | Horst | H04L 61/5046 |
| | | | 710/106 |
| 2016/0196230 A1 | 7/2016 | Pihet | |
| 2018/0137071 A1* | 5/2018 | Sturm | G06F 13/374 |
| 2020/0327085 A1* | 10/2020 | Kang | H04L 12/4013 |
| 2020/0364174 A1 | 11/2020 | Chandra et al. | |
| 2021/0184890 A1 | 6/2021 | Kim et al. | |
| 2021/0360526 A1 | 11/2021 | Nagamani et al. | |
| 2022/0393715 A1* | 12/2022 | Walker | H04L 12/4013 |
| 2024/0356773 A1 | 10/2024 | Elend et al. | |

FOREIGN PATENT DOCUMENTS

| | | | |
|---|---|---|---|
| EP | 3217602 A1 | 9/2017 | |
| EP | 3393061 A1 | 10/2018 | |
| EP | 3926904 A1 | 12/2021 | |

\* cited by examiner

CONTROLLER AREA NETWORK MODULE AND A METHOD FOR THE CAN MODULE

CROSS-REFERENCE TO RELATED APPLICATIONS

This application claims priority under 35 U.S.C. § 119 to European patent application number 23168569.4, filed Apr. 18, 2023, the contents of which are incorporated by reference herein.

TECHNICAL FIELD

The present disclosure relates to a Controller Area Network (CAN) module and a method for the CAN module.

BACKGROUND

Controller area network (CAN) buses can be used for communications within vehicles, in particular within automobiles. It will be appreciated that CAN buses also have application outside of the field of automobiles. A CAN bus system may include multiple CAN devices, so called as nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. Several nodes may be connected to a CAN network, such that the nodes can communicate among each other over the CAN network using a CAN protocol. The CAN protocol is used to enable communications between the various nodes. The data link layer of the CAN protocol is standardized as International Standards Organization (ISO) 11898-1:2003. CAN Flexible Data-Rate or "CAN FD," which is an extension of the standardized CAN data link layer protocol and is integrated into the ISO11898-1:2015 standard, CAN FD may provide higher data rates. The standardized CAN data link layer protocol is being further extended to provide even higher data rates. A further extension, referred to as CAN XL, with a new (optional) level scheme on the physical layer allowing even higher data rates is in the definition phase discussed under CiA610 (CAN in Automation) and is moving towards standardization in the form of ISO11898-1:202x.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

According to a first aspect of the present disclosure, a Controller Area Network, CAN, module is provided, wherein the CAN module comprising: a transmit data, TXD, interface, for sending a TXD signal, a receive data, RXD, interface, for receiving an RXD signal, a CAN controller coupled to both, the TXD interface and the RXD interface, wherein the CAN module is configured to perform the following steps a) to c):
  a) detect a first reference time at an end of an idle state of a CAN bus based on the RXD signal;
  b) sample a first bit value of the RXD signal at a first sample time, wherein a first time interval between the first reference time and the first sample time is between 30% and 90% of a predefined reference time interval;
  c) sample a second bit value of the RXD signal at a second sample time such that the predefined reference time interval is provided between the first sample time and the second sample time;
wherein the CAN module is further configured according to one of the two following configurations K1) or K2):
  K1) if the second bit value represents a dominant signal level, as step d) discarding the first or second bit value so that the remaining, non-discarded bit value forms a start bit value;
  K2) if the second bit value represents a dominant signal level, as step d) discarding the first and second bit values and replacing the two discarded bit values by an additionally acquired or determined start bit value of the RXD signal which represents a dominant signal level and to which a start sample time is assigned which is arranged between the first sample time and the second sample time;
wherein the CAN module is further configured to perform the following steps e) to f):
  e) sample at least one further bit value of the RXD signal; and
  f) generate an RXD frame based on the bit values of the RXD signal, except for the at least one discarded bit value.

In one or more embodiments, the CAN module is configured to perform the following steps:
  periodically sample the RXD signal;
  detect an idle state of the CAN bus by detecting at least eleven consecutive sampled bit values each representing a recessive signal level of the RXD signal.

In one or more embodiments, the CAN module is configured to perform, for step a), the steps of claim 2 and the following steps:
  at the end of the idle state, detecting a first signal change from a recessive signal level to a dominant signal level represented by the RXD signal; and
  detect the first reference time of the end of the idle state.

In one or more embodiments, the CAN module is configured to interpret the start bit value as a representation of a first bit, SOF, of the RXD frame.

In one or more embodiments, the predefined reference time interval is less than two microseconds.

In one or more embodiments, the predefined reference time interval is between 200 nanoseconds and 1500 nanoseconds.

In one or more embodiments, the CAN module is configured to send a TXD signal representing a TXD frame via the TXD interface, wherein the first bit of the TXD frame is a dominant bit and the second bit of the TXD frame is a recessive bit.

In one or more embodiments, the CAN module is configured to cancel sending the TXD signal if the second bit value of the RXD signal has a dominant signal level.

In one or more embodiments, the CAN module is configured to
  confirm the idle state after its detection with each additional sampled bit value of the RXD signal representing the recessive signal level; and
  start sending the TXD signal after a predefined number of further sampled bit values, each representing a recessive signal level of the RXD signal, following the detection of the idle state, preferably except if a previous attempt to send the TXD signal has been canceled.

In one or more embodiments, the CAN module is configured, if the second bit value represents a dominant signal level and a third bit value of a sampling following the sampling of the second bit value represents a dominant signal level, to overwrite the third bit value, if the third bit value was detected as representing signal value, so that the third bit value represents a recessive signal level.

In one or more embodiments, wherein the CAN module is configured, if the CAN module is configured according to the configuration K1), to sample the first bit value, the second bit value, and the at least one further bit value from step e) such that the predefined reference time interval is provided between each two successive sampling instants of said bit values.

In one or more embodiments, the CAN module is configured, if the CAN module has the configuration K2), to sample the at least one further bit value of the RXD signal in step e) after the second sample time such that the predefined reference time interval is provided between the start sample time and the sample time of the further bit value following the start bit value.

In one or more embodiments, the CAN module is configured, if the CAN module is configured according to the configuration K2), to perform the following sub-steps of step d) of the configuration K2):
  d.1) detecting a second signal change from the dominant signal level to the recessive signal level represented by the RXD signal;
  d.2) detecting a second reference time of the second signal change; and
  d.3) assigning the start sample time to the start bit value, such that a second time interval between the start sample time and the second reference time is between 10% and 50% of the predefined reference time interval.

In one or more embodiments, the CAN module is configured, if the second bit value represents a dominant signal level, to perform the following steps:
  e.1) after step e), detecting a third signal change from the recessive signal level to the dominant signal level represented by the RXD signal;
  e.2) detecting a third reference time of the third signal change; and
  e.3) sampling at least one further bit value of the RXD signal after the third signal change;
  wherein a third time interval between the third reference time and the sampling time of the sampling of a bit value following the third signal change is between 30% and 90% of the predefined reference time interval; and wherein the predefined reference time interval is provided between each two successive sampling instants of step e.3).

According to a second aspect of the present disclosure, a method for a Controller Area Network, CAN, module is provided, wherein the CAN module comprises a transmit data, TXD, interface, a receive data, RXD, interface, a CAN controller coupled to both, the TXD interface and the RXD interface, and wherein the method comprising the following steps a.0) to c):
  a.0) receiving an RXD signal via the RXD interface;
  a) detecting a first reference time at an end of an idle state of a CAN bus based on the RXD signal;
  b) sampling a first bit value of the RXD signal at a first sample time, wherein a first time interval between the first reference time and the first sample time is between 60% and 90% of a predefined reference time interval;
  c) sampling a second bit value of the RXD signal at a second sample time such that the predefined reference time interval is provided between the first sample time and the second sample time;
  wherein the CAN module is further configured according to one of the two configurations K1) or K2),
  wherein the method comprising, if the CAN module is in configuration K1), as further step d) the following:
    discarding, if the second bit value represents a dominant signal level, the first or second bit values so that the other bit value forms a start bit value;
  wherein the method comprising, if the CAN module is in configuration K2), as further step d) the following:
    discarding, if the second bit value represents a dominant signal level, the first and second bit values and replacing the two discarded bit values by an additionally acquired or determined start bit value of the RXD signal which represents a dominant signal level and to which a start sample time is assigned which is arranged between the first sample time and the second sample time;
  wherein the method comprising the further steps e) to f):
  e) sampling at least one further bit value of the RXD signal; and
  f) generating an RXD frame based on the bit values of the RXD signal, except for the at least one discarded bit value.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
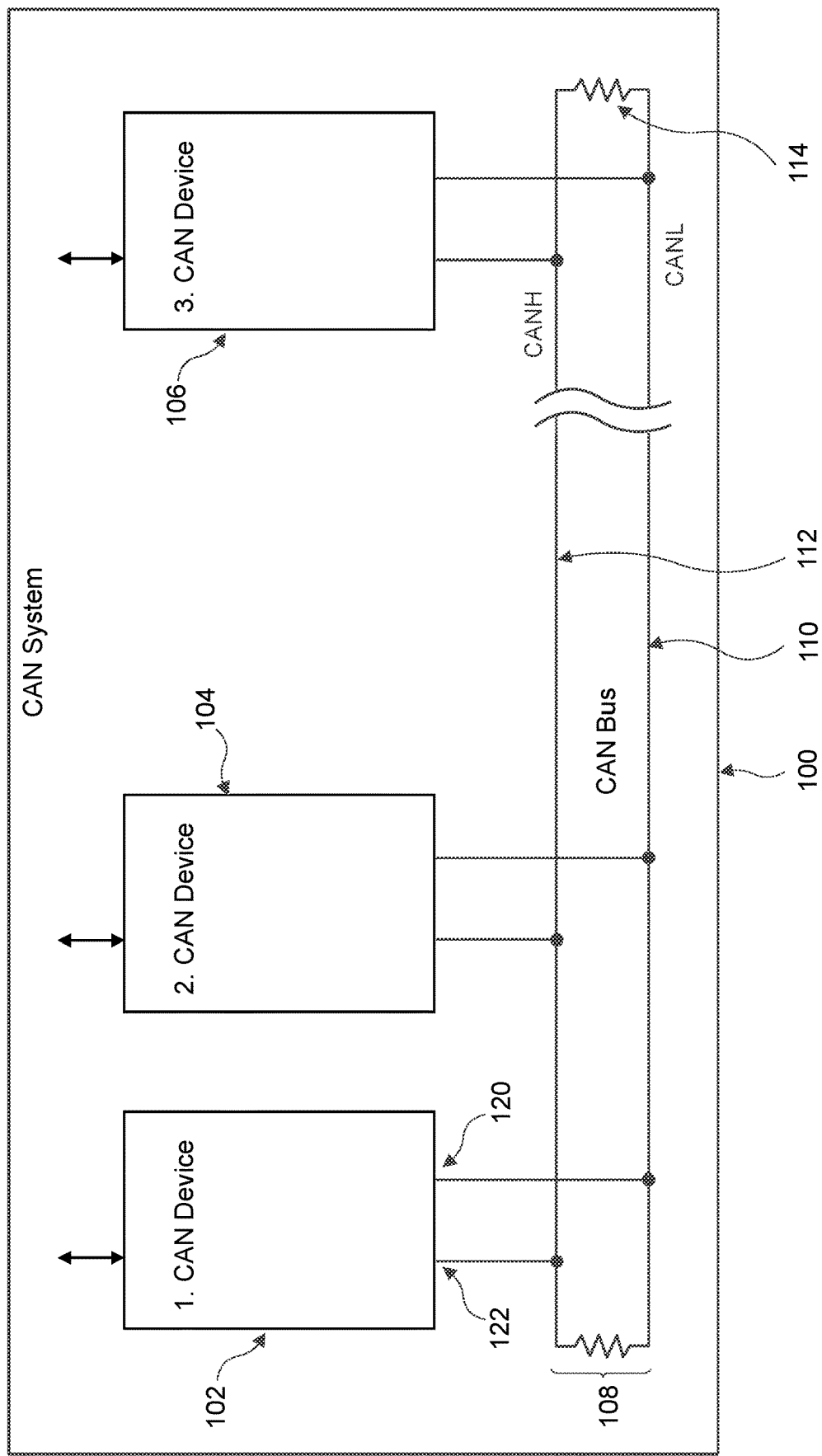
FIG. 1 shows a block diagram of an embodiment of a CAN System.

FIG. 1 shows an example of a CAN system 100. The CAN system 100 includes a plurality of CAN devices 102, 104, 106 and a CAN BUS network 108. The CAN BUS network 108 includes a first CAN line 110, also referred to as CANH, and a second CAN line 112, also referred to as CANL. The two CAN lines 110, 112 may be coupled at opposite ends via terminating resistors 114. The CAN BUS network 108 may also be referred to as CAN bus 108.

Each CAN device 102, 104, 106 is coupled to the CAN BUS network 108. For coupling, each CAN device 102, 104, 106 includes a first interface 120, also referred to as a first device interface 120, and a second interface 122, also referred to as a second device interface 122. Each CAN device 102, 104, 106 may be connected to the first CAN line 110 and the second CAN line 112 via the associated device interfaces 120, 122.

Figure 2:
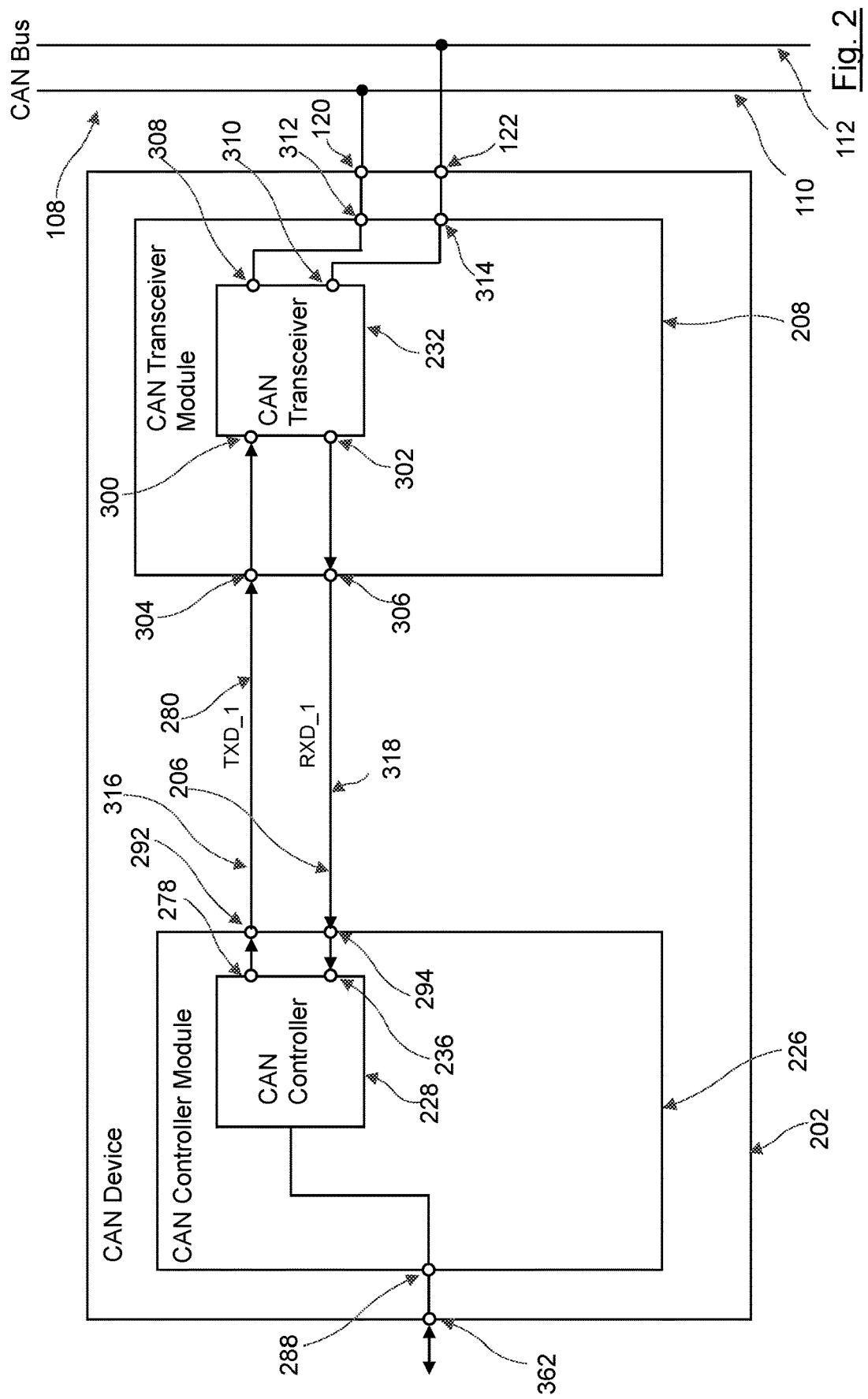
FIG. 2 shows a simplified block diagram of a CAN device.

In FIG. 2, an example of a CAN device 202 is schematically shown in detail. Each CAN device 102, 104, 106 of FIG. 1 can be formed by a CAN device 202 of FIG. 2. The CAN device 202 may have implemented Classical CAN, CAN FD and/or CAN XL. The CAN device 202 may comprise a CAN controller module 226 and a CAN transceiver module 208.

The CAN controller module 226 may also be referred to as a CAN module 226 or as a controller module 226. The CAN controller module 226 may be configured as a device or unit. Although the CAN controller module 226 is described preferably as a possible part of the CAN device 202 in the following explanations, the explanations for the CAN controller module 226 of the CAN device 202 apply analogously to a single CAN controller module 226, that is not necessarily a part of the CAN device 202. As the CAN controller module 226 does not necessarily form a part of the CAN device 202, the CAN controller module may, in an example, be understood as a device as well. But, as indicated above, the controller module 226 may—in an example—be configured as a separate or integrated unit of the CAN device 202.

The CAN controller module 226 includes a CAN controller 228. The CAN controller 228 may have implemented Classical CAN, CAN FD and/or CAN XL. For implementing the respective CAN protocol, the CAN controller 228 may have a microcontroller by which the respective protocol is implemented. The CAN controller module 226 may be fully formed by the CAN controller 228. In such an embodiment, the explanations for the CAN controller module 226 may apply for the CAN controller 228, and/or vice versa.

The CAN controller 228 comprises a first transmit data, TXD, interface 278. Via the first TXD interface 278, the CAN controller 228 may transmit a TXD signal 280. The TXD signal 280 may represent one or more CAN frames. Each CAN frame comprises a plurality of bits, each representing either a logical "0" or a logical "1". The bits are transmitted by means of the TXD signal 280 in the form of a bit stream. A sequence of a plurality of bits and/or a sequence of a plurality of CAN frames may therefore be represented by the TXD signal 280. The CAN controller 228 also includes a first receive data, RXD, interface 236. The first RXD interface 236 may allow the CAN controller 228 to receive a RXD signal 206. The RXD signal 206 may represent one or more CAN frames. As previously discussed, each CAN frame may comprise a plurality of bits. The bits are transmitted by means of the RXD signal 206 in the form of a bit stream. A sequence of a plurality of bits and/or a sequence of multiple CAN frames may therefore be represented by the RXD signal 206.

The CAN controller module 226 may include a TXD interface 292 connected to the first TXD interface 278 of the CAN controller 228. In an example, the TXD interface 292 may be formed by the first TXD interface 278 of the CAN controller 228 (not shown). When referring to the first TXD interface 278, such reference may refer to either the first TXD interface 278 of the CAN controller 228 and/or to the TXD interface 292 of the CAN controller module 226.

The CAN controller module 226 may include an RXD interface 294 connected to the first RXD interface 236 of the CAN controller 228. In an example, the RXD interface 294 may be formed by the first RXD interface 236 of the CAN controller 228 (not shown). When referring to the first RXD interface 236, such reference may refer to either the first RXD interface 236 of the CAN controller 228 and/or the RXD interface 294 of the CAN controller module 236.

The CAN transceiver module 208 of the CAN device 202 comprises the CAN transceiver 232. The CAN transceiver 232 comprises a TXD interface 300, referred to as the third TXD interface 300. The third TXD interface 300 allows the CAN transceiver 232 to receive the TXD signal 280. The CAN transceiver 232 further comprises an RXD interface 302, referred to as the third RXD interface 302. The CAN transceiver 232 is configured to send the RXD signal 206 via the third RXD interface 302.

The CAN transceiver module 208 may include another TXD interface 304 connected to the third TXD interface 300 of the CAN transceiver 232. In an example, the TXD interface 304 may be formed by the third TXD interface 300 of the CAN transceiver 232 (not shown). When referring to the third TXD interface 300, such reference may be to either the third TXD interface 300 of the CAN transceiver 232 and/or the TXD interface 304 of the CAN transceiver module 208.

The CAN transceiver module 208 may include another RXD interface 306 connected to the third RXD interface 302 of the CAN transceiver 232. In an example, the RXD interface 306 may be formed by the third RXD interface 302 of the CAN transceiver 232 (not shown). When referring to the third RXD interface 302, this reference may refer to either the third RXD interface 302 of the CAN transceiver 232 and/or the RXD interface 306 of the CAN transceiver module 208.

The CAN transceiver 232 includes a first CAN BUS interface 308 and a second CAN BUS interface 310. The CAN transceiver 232 is preferably configured to generate a CAN bus signal based on the TXD signal 280. The CAN bus signal is a differential voltage signal that can be generated by the CAN transceiver 232 at the first and second CAN BUS interfaces 308, 310. When the CAN transceiver 232 receives the TXD signal 280 representing the at least one (1) bit, the CAN transceiver 232 will generate the CAN bus signal based on the TXD signal 280 such that the CAN bus signal represents the at least one (1) bit as well. Often, the TXD signal 280 represents a sequence of bits in the form of a bit stream. In this case, the CAN bus signal may be generated by the CAN transceiver 232 such that the CAN bus signal also represents the sequence of bits.

The first CAN BUS interface 308 of the CAN transceiver 232 may be connected to the first CAN bus line 110 of the CAN bus 108. The connection between the first CAN BUS interface 308 and the first CAN bus line 110 may be established via at least one further interface 312, 120. The CAN transceiver module 208 may include the further interface 312. In an example, the first CAN BUS interface 308 of the CAN transceiver 232 may be connected to the interface 312, which may be connected to the first device interface 120 of the CAN device 202. The first device interface 120 may be connected to and/or configured to be connected to the first CAN bus line 110.

The second CAN BUS interface 310 of the CAN transceiver 232 may be connected to the second CAN bus line 112 of the CAN bus 108. The connection between the second CAN BUS interface 310 and the second CAN bus line 112 may be established via at least one further interface 314, 122. The CAN transceiver module 208 may include a further interface 314. In an example, the second CAN BUS interface 310 of the CAN transceiver 232 may be connected to the interface 314, which may be connected to the second device interface 122 of the CAN device 202. The second device interface 122 may be connected to and/or adapted to be connected to the second CAN bus line 112.

Figure 3:
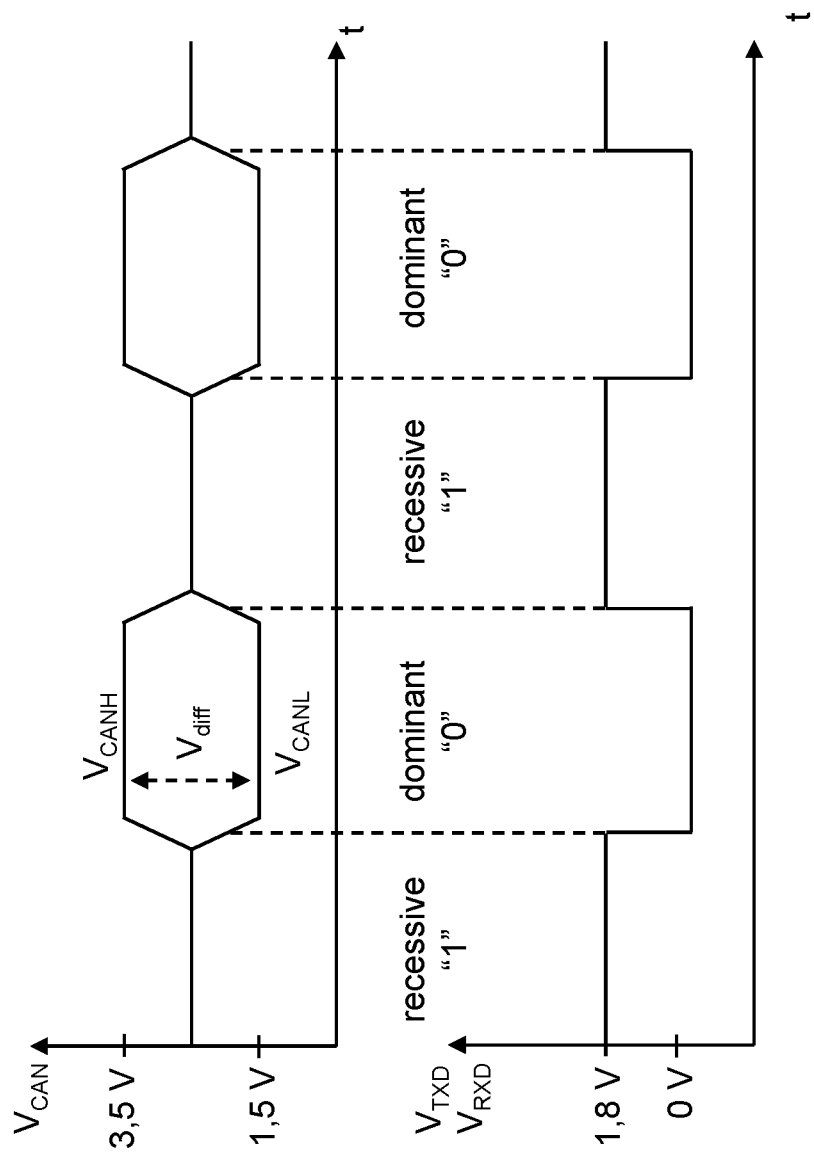
FIGS. 3 to 7 shows a simplified signal charts.

FIG. 3 schematically shows an example of a signal waveform of a CAN bus signal as a differential voltage signal $V_{CAN}$. The differential voltage signal is composed of the first voltage signal $V_{CANL}$ and the second voltage signal $V_{CANH}$. If the first voltage signal $V_{CANL}$ and the second voltage signal $V_{CANH}$ are at the same level, preferably at 2.5 V, this state represents the logical bit "1", which is also referred to as a recessive bit or recessive bit "1". If the first voltage signal $V_{CANL}$ is at a low level, preferably about 1.5 V, and the second voltage signal $V_{CANH}$ is at a high level, preferably about 3.5 V, this state represents logic bit "0", which is also referred to as dominant bit or dominant bit "0".

The CAN transceiver 232 may be configured to detect the CAN bus signal of the CAN bus 108 via the first and second CAN BUS interfaces 308, 310. The CAN transceiver 232 may be configured to generate and transmit the RXD signal 206 via the third RXD interface 302 based on the detected CAN bus signal. In an example, if the CAN bus signal shown schematically in FIG. 3 is generated on the CAN bus 108, the CAN transceiver 232 may generate the RXD signal also shown schematically in FIG. 3 as the RXD signal 206.

FIG. 3 schematically shows an example of the signal of the RXD signal VRXD. If the RXD signal VRXD is at a first signal level, which is also referred to as a recessive signal level, then the RXD signal VRXD or the first signal level represents the logical bit "1", which is also referred to as a recessive bit or recessive bit "1". If the RXD signal VRXD is at a second signal level, which is also referred to as the dominant signal level, then the RXD signal or the second signal level represents the logical bit "0", which is also referred to as the dominant bit or the dominant bit "0". The recessive signal level of the RXD signal VRXD may be between 1.5 V and 6 V, preferably with an allowable deviation of less than 0.2 V. In an example, the recessive signal level of the RXD signal VRXD may be 1.8 V, 3.3 V or 5 V, in each example preferably with an allowable deviation of less than 10%. The dominant signal level of the RXD signal VRXD may be 0 V in an example, with an allowable deviation of less than 0.2 V. As can be seen from FIG. 3, a sequence of bits can be represented via the RXD signal VRXD. The CAN transceiver 232 may be used to convert a CAN bus signal of the CAN bus 108 to the RXD signal 206.

In principle, the CAN transceiver 232 can also be used to convert the TXD signal 280 into a CAN bus signal in the form of a differential voltage signal between the first and second CAN BUS interfaces 308, 310.

The example for the signal waveform of the RXD signal VRXD from FIG. 3 can also be understood in an analogous way as an example for a signal waveform of a TXD signal VTXD. If the TXD signal VTXD is at a first signal level, which is also referred to as a recessive signal level, then the TXD signal VTXD or the first signal level represents the logical bit "1", which is also referred to as a recessive bit or recessive bit "1". If the TXD signal VTXD is at a second signal level, which is also referred to as the dominant signal level, then the TXD signal or the second signal level represents the logical bit "0", which is also referred to as the dominant bit or the dominant bit "0". The recessive signal level of the TXD signal VTXD may be between 1.5 V and 6 V, preferably with a permissible deviation of less than 0.2 V. In an example, recessive signal level of the TXD signal VTXD may be 1.8 V, 3.3 V or 5 V, in each example preferably with an allowable deviation of less than 10%. The dominant signal level of the TXD signal VTXD can be 0 V in an example, with a permissible deviation of less than 0.2 V. As can be seen from FIG. 3, a sequence of bits can be represented via the TXD signal VTXD. The CAN transceiver 232 may be used to convert the TXD signal 280 into a CAN Bus Signal for the CAN bus 108.

Referring to FIG. 2, it was previously explained that the CAN device 202 may include the CAN transceiver module 208 and the CAN controller module 226.

Preferably, the first TXD interface 278 of the CAN controller 228 is connected to the third TXD interface 300 of the CAN transceiver 232 via a first signal connection 316. In an example, the first signal connection 316 may extend from the first TXD interface 278 through the interface 292 and the interface 304 to the third TXD interface 300. The first signal connection 316 may allow the CAN controller 228 to transmit the TXD signal 280 from the first TXD interface 278 to the third TXD interface 300 of the CAN transceiver 232.

Preferably, the third RXD interface 302 of the CAN transceiver 232 is connected to the first RXD interface 236 of the CAN controller the 228 via a second signal connection 318. In an example, the second signal connection 318 may extend from the third RXD interface 302 through the interface 306 and the interface 294 to the first RXD interface 236. The second signal connection 318 may allow the CAN transceiver 232 to transmit the RXD signal 206 from the third RXD interface 302 to the first RXD interface 236 of the CAN controller 228.

The CAN controller 228 may have implemented Classical CAN, CAN FD and/or CAN XL. Each of these three protocols requires that a CAN frame terminates with an EOF field. The EOF field consists of a predetermined number of recessive bits, preferably exactly seven recessive bits.

Figure 4:
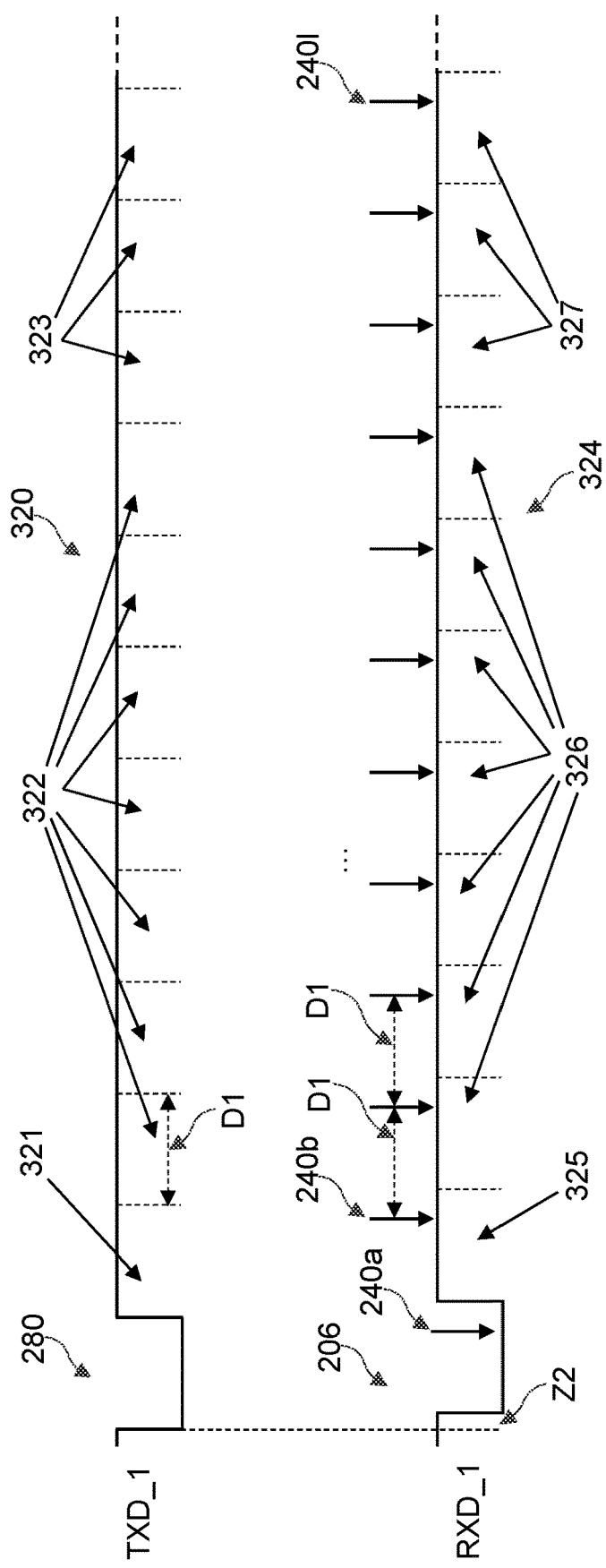

FIG. 4 schematically illustrates an example of a portion of a TXD signal 280 representing an end portion of a CAN frame. The end portion of the CAN frame includes the Acknowledge Delimiter (ADL) bit 321 and the EOF field 320, which in this example comprises a sequence of seven recessive bits 322. Additionally, the TXD signal 280 represents three more recessive bits 323 that follow the EOF field as intermission bits 323. By the end of the time while the eleven recessive bits (the ADL bit, the bits 322 of the EOF field 320, and the intermission bits 323) are being transmitted via the CAN bus 108 by means of a CAN bus signal, the CAN bus 108 reaches an idle state and/or turns into the idle state. The idle state of the CAN bus 108 preferably exists once a CAN bus signal of the CAN bus 108 represents a sequence of at least a predetermined number of recessive bits, preferably a sequence of at least eleven recessive bits. The idle state of the CAN bus 108 may be maintained if the CAN bus signal of the CAN bus represents further recessive bits following the sequence of the predefined number of recessive bits. In an example, the idle state may last longer if a plurality of recessive bits follow the aforementioned sequence of recessive bits. The idle state may be very short in another example if at least one dominant bit directly follows the aforementioned sequence with the predefined number of recessive bits.

FIG. 4 also schematically illustrates an example of a portion of a RXD signal 206 representing an end portion of a CAN frame. The RXD signal 206 may be caused by the example of the previously mentioned TXD signal 280. The end portion of the CAN frame represented by the RXD signal 206 therefore also includes an ADL bit 325 and an EOF field 324. The EOF field 324 is directly followed by a sequence of intermission bits 327, which are also represented by the RXD signal 206. The sequence of intermission bits 327 may consists of three bits. Each intermission bit 327 is a recessive bit. The EOF field 324 consists in this example of a sequence of seven recessive bits 326. Consequently, the RXD signal 206 may represent a combined sequence of at least eleven recessive bits, where the end of the last bit of this sequence indicates the start of an idle state of the CAN bus 108.

The CAN controller 228 may be configured to periodically sample the RXD signal 206. At each sampling, the current value of the RXD signal 206 is detected. A value of an RXD signal, in particular the RXD signal 206, detected by sampling may also be referred to as a bit value. The CAN controller 228 may be configured, such that the sampling timing is synchronized to a falling edge of the RXD signal, in particular the RXD signal 206. The time interval D1 between the points in time for sampling preferably corresponds to the duration D1 of a bit represented by the RXD signal 206 or by the TXD signal 280. The time interval D1 may be predefined.

In FIG. 4, each sampling of bit value 240a-240l of the RXD signal 206 is schematically represented by an arrow symbol. In the example of FIG. 4, the RXD signal 206 represents a CAN frame, where its end portion comprises a sequence of seven recessive bits 326. The RXD signal 206 also represents a directly following sequence of three recessive bits 327, which are intermission bits 327. As the CAN controller 228 may sample the RXD signal 206, in particular may sample it periodically, the CAN controller 228 will preferably sample a sequence of eleven recessive bit values 240b-240l at and following the end of the CAN frame. The end of this sequence of eleven recessive bit values 240b-240l represents the start of an idle state of the CAN bus 108. The CAN controller 228 is preferably configured to detect a sequence of at least eleven sampled recessive bit values 240b-240l of the RXD signal 206 and caused by a positive detection of said sequence to detect a first idle state 216 of the CAN bus 108.

Figure 6:
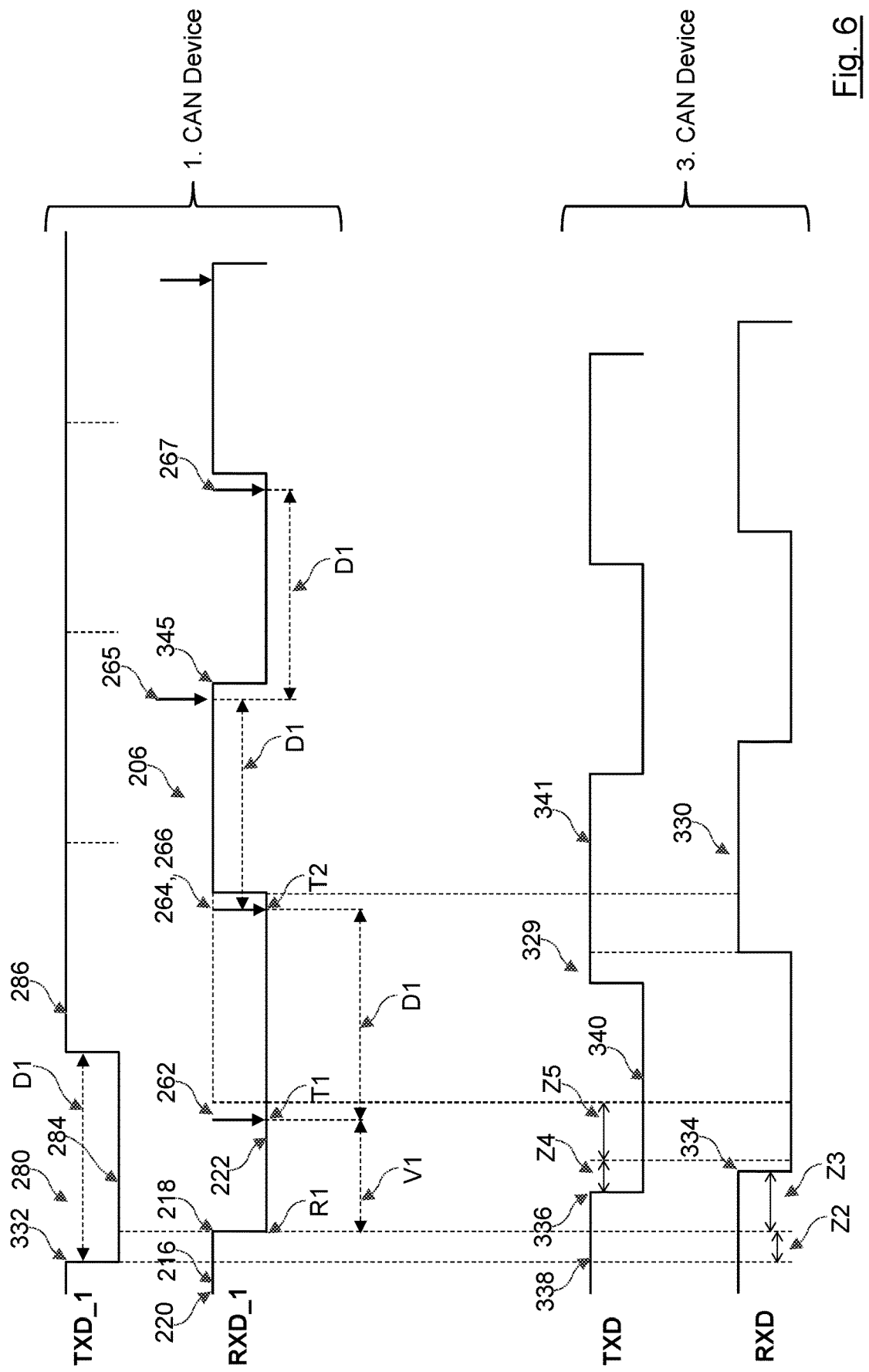

FIG. 6 schematically illustrates another example of an RXD signal 206. The CAN controller 228 and/or the CAN module 226 may be configured to detect the time of the end of the idle state 216 as a first reference time R1. At the end of the idle state 216 or at the first reference time R1, a change from a recessive signal level 220 to a dominant signal level 222 of the RXD signal occurs. The CAN controller 228 may be configured to synchronize the further samples of the RXD signal 206 with the first reference time R1.

In FIG. 4, the bits of the CAN frame represented by the RXD signal 206 are delayed with respect to the bits of the identical CAN frame represented by the TXD signal 280 by a time Z2, referred to as the second delay time Z2. The second delay time Z2 is (at least mainly) caused by the CAN transceiver 232.

Each CAN device 102, 104, 106 of the CAN system 100 (see FIG. 1) may be configured according to the CAN device 202. When the CAN controller 228 of the CAN controller module 226 of the first CAN device 102 generates a TXD signal 280 representing a CAN frame, the last portion of which is schematically shown in FIG. 4. Preferably, the CAN transceiver 232 of the CAN transceiver module 208 of the first CAN device 102 is configured to and will generate the RXD signal 206 (see FIG. 4) and will also generate a CAN bus signal on the CAN bus 108 representing the bits of the CAN frame in the form of a bit sequence (or bit stream).

Figure 5:
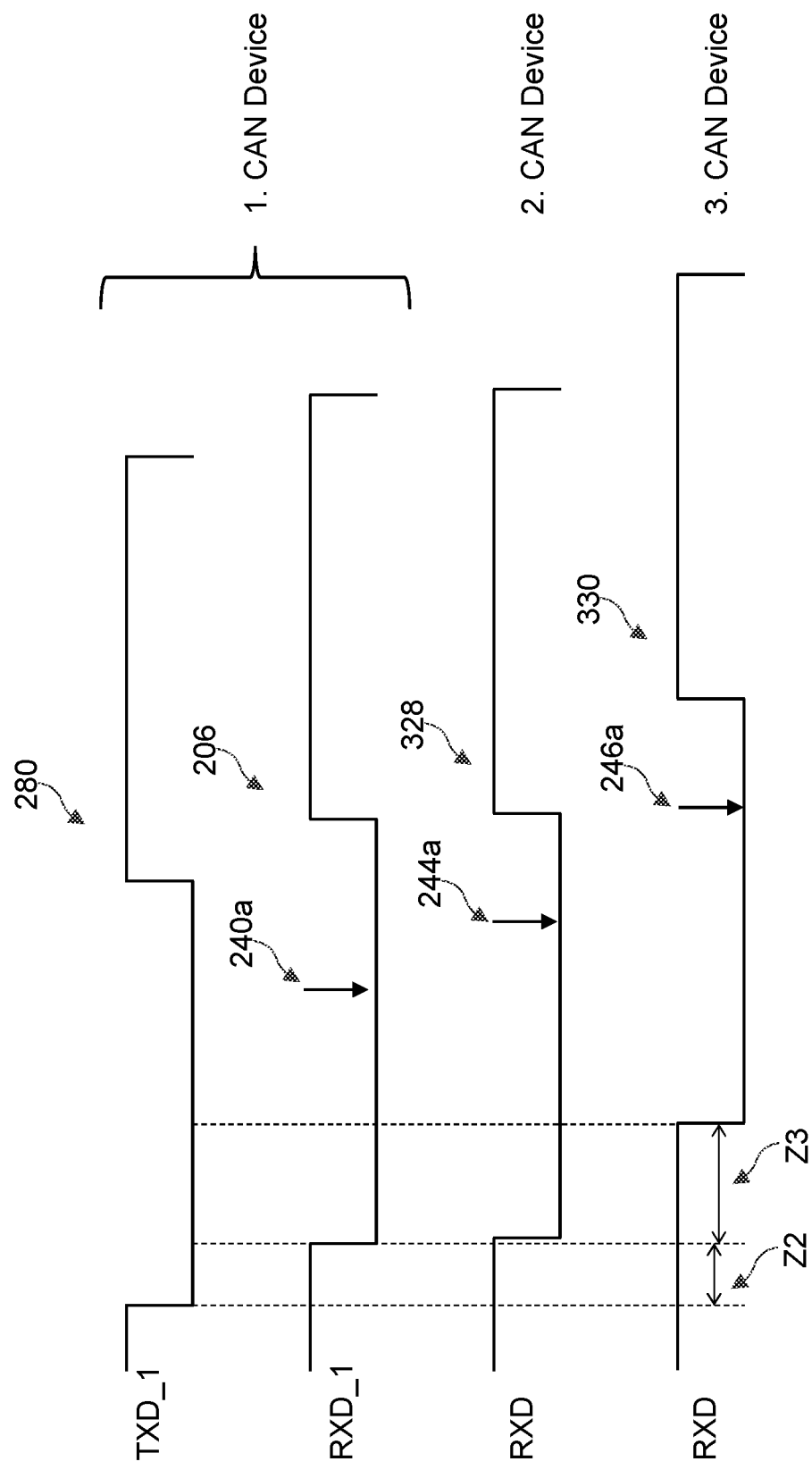

The CAN bus signal is received by the CAN transceiver 232 of the CAN transceiver module 208 of the second CAN device 104 and is converted into an RXD signal 328, which also represents the bits of the CAN frame. In FIG. 5, a portion of the RXD signal 328 generated by the CAN transceiver 232 of the CAN transceiver module 208 of the second CAN device 104 is schematically shown. Referring to FIG. 1, it is assumed that the second CAN device 104 has a small distance to the first CAN device 102. Due to this small distance, the bits of the CAN frame represented by the RXD signal 328 are delayed by approximately the same second delay time Z2 with respect to the bits of the identical CAN frame represented by the TXD signal 280.

The CAN bus signal is also received by the CAN transceiver 232 of the CAN transceiver module 208 of the third CAN device 106 and converted into an RXD signal 330, which also represents the bits of the CAN frame. In FIG. 5, a portion of the RXD signal 330 generated by the CAN transceiver 232 of the CAN transceiver module 208 of the third CAN device 106 is schematically shown. With reference to FIG. 1, it is assumed that the third CAN device 106 has a large distance to the first CAN device 102. Due to the large distance, the bits of the CAN frame represented by the RXD signal 330 are delayed relative to the bits of the identical CAN frame represented by the TXD signal 280 by both second delay time Z2 and a further time, referred to as third delay time Z3. The third delay time Z3 is caused by the length of each of the two CAN bus lines 110, 112 (between the CAN bus devices 102, 106).

FIG. 6 schematically illustrates another example of a portion of the signal waveforms of the TXD signal 280 and the RXD signal 206 that may be generated in the first CAN device 102. It is assumed that the CAN controller 228 of the CAN controller module 226 of the first CAN device 102 may detect a first idle state 216 of the CAN bus 108 based on the RXD signal 206. Once the first idle state 216 becomes present or if the first idle state 216 is present for some time, the CAN controller 228 of the CAN controller module 226 of the first CAN device 102 may begin to send a new CAN frame via the TXD signal 280. The first bit of the new CAN frame is a dominant bit 284, also referred to as the start of frame bit 284 or SOF bit 284 of the new CAN frame. The SOF bit 284 generates a signal change, referred to as the third signal change 332, from a recessive signal level of the TXD signal 280 to a dominant signal level of the TXD signal 280. Delayed by the second time delay Z2, a corresponding signal change, referred to as the first signal change 218, occurs in the RXD signal 206. At the first signal change 218, the RXD signal 206 changes from the recessive signal level 220 to the dominant signal level 222. Delayed by the additional third time delay Z3, a signal change referred to as the fourth signal change 334 is also caused in the RXD signal 330 generated by the CAN transceiver 232 of the CAN transceiver module 208 of the third CAN device 106 due to the CAN bus signal.

The cumulative delay from the second delay time Z2 and the third delay time Z3 causes the third CAN device 106 to delay detecting that the first CAN device 102 has already started sending a new CAN frame. In a worst case scenario, the third CAN device 106 may also start sending another new CAN frame during the period of the third delay time Z3, resulting in a fifth signal change 336 in the TXD signal 329 of the third CAN device 106. Theoretically, the fifth signal change 336 would result in a signal change in the RXD signal 330 of the third CAN device 106 delayed by the delay time Z4, which is also referred to as the fourth delay time Z4. However, in the example of FIG. 6, the fourth signal change 334 caused by the signal change 332 in the TXD signal 280 of the first CAN device 102 has already occurred previously. As a result, a situation may arise in which two different CAN devices 102, 106 attempt, at least overlapping in time, to transmit a CAN frame over a CAN bus signal on the CAN bus 108. During the sampling of the RXD signal 330 of the third CAN device 106, this situation is initially not noticeable. However, said situation leads to a relevant distortion of the RXD signal 206 at the first CAN device 102. The fifth signal change 336 from the recessive signal level 338 to the dominant signal level 340 of the TXD signal 329 of the third CAN device 106 has a delayed effect on the RXD signal 206 at the first CAN device 102 by the fourth time delay Z4 and by a further fifth time delay Z5, so that also the dominant signal level 340 of the TXD signal 329 of the third CAN device 106 causes the dominant signal level 222 of the RXD signal 206 at the first CAN device 102. The fifth time delay Z5 is caused by the assumed long length of the two CAN bus lines 110, 112 (between the CAN devices 102, 106). The dominant signal level 222 of the RXD signal 206, which was initially caused by the third signal change 332 of the TXD signal 280 of the first CAN device 102 following the first signal change 218, is extended by the dominant signal level 340 of the TXD signal 329 of the third CAN device 106. In the example of FIG. 6, the first bit value 262 and the second bit value 264 sampled by sampling subsequent to the first signal change 218 and/or the third signal change 332 each represent a dominant bit, even though neither the TXD signal 280 of the first CAN device 102 nor the TXD signal 329 of the third CAN device 106 intended to send two consecutive dominant bits (as the first two bits).

Against this background, there is a need to provide a way to handle corruption of the reconstructed bits of a CAN frame when the distance between two CAN devices in a CAN system 100 is particularly large while maintaining a high transmission rate.

As previously explained, corruption of the bits of a CAN frame to be reconstructed may occur. The corruption appears in a dominant signal level 222 of the RXD signal 206 of the CAN controller 228, where the duration of the dominant signal level 222 is longer than a predefined time interval D1, which should be the regular duration of each bit, and thus may overrule in part or completely the recessive level 286.

Therefore, the CAN controller module 226 is proposed. The CAN controller module 226 may also be referred to as CAN controller module 226 or controller module 226. The CAN controller module 226 comprises the TXD interface 292 for sending a TXD signal 280, the RXD interface 294 for receiving the RXD signal 206, and the CAN controller 228. The CAN controller 228 is preferably coupled to both, the TXD interface 292 and the RXD interface 294. In an example, the CAN controller 228 may form both, the TXD interface by the TXD interface 278 of the CAN controller 228 and the RXD interface 294 by the RXD interface 236 of the CAN controller 228.

The CAN controller module 226, and/or in an example its CAN controller 228, is configured to perform the following step a):

Step a): Detect a first reference time R1 at an end of an idle state 216 of a CAN bus 108 based on the RXD signal 206.

As explained before, the CAN controller 228 may be configured to periodically sample the RXD signal 206. At each sampling, the current value of the RXD signal 206 is detected. The time interval D1 between sampling instants preferably corresponds to the duration D1 of a bit represented by the TXD Signal 280 or the RXD signal 206. In FIG. 4, each sampling of the RXD signal 206 is schematically represented by an arrow symbol. The timing of the samples may be synchronized to a falling edge of the TXD Signal 280 or of the RXD signal 206. In the example of FIG. 4, the RXD signal 206 represents a CAN frame, wherein the CAN frame's end portion comprises a sequence of eight recessive bits, which are formed by a single ADL bit 325 and seven subsequent recessive bits, which form the EOF field 324 of the CAN frame. Additionally, the RXD signal 206 represents three more recessive bits 326 that follow the bits of the CAN frame as intermission bits 327. Since the CAN controller 228 is preferably configured to sample the RXD signal 206, in particular to sample it periodically, the CAN controller 228 in this example will sample a sequence of eleven recessive bit values 240b-240l at and following the end of the CAN frame. The end of this sequence of eleven recessive bit values 240b-240l represents the start of the idle state of the CAN bus 108. The CAN controller module 226, and in particular its CAN controller 228, may be configured to detect a sequence of at least eleven sampled recessive bit values 240b-240l of the RXD signal 206 and to detect a first idle state 216 of the CAN bus 108 caused by a positive detection of said sequence.

The CAN controller 228 may be configured to detect the first signal change 218 at the end of the first idle state 216. To detect the first signal change 218, the CAN controller 228 may sample the RXD signal 206 at a significantly higher sampling rate than explained in the preceding paragraph. The duration (time) between every two subsequent samplings of such samplings may be less than 10% of the duration D1. In other words, the sampling rate for such samplings may be at least ten times higher as for the samplings to gain the bit values 262, 264, 265. Also, in this type of "high rate" sampling operation, a plurality of samplings of the RXD signal 206 may be performed by the CAN controller 228, so that the first reference time R1 at which the first signal change 218 occurs can be accurately detected by the CAN controller 228 based on the plurality of samplings of the RXD signal 206.

The CAN controller module 226, and/or in an example its CAN controller 228, is configured to perform the following steps b) and c):

Step b): Sample a first bit value 262 of the RXD signal 206 at a first sample time T1, wherein a first time interval V1 between the first reference time R1 and the first sample time T1 is between 30% and 90% of a predefined reference time interval D1; and Step c): Sample a second bit value 264 of the RXD signal 206 at a second sample time T2 such that the predefined reference time interval D1 is provided between the first sample time T1 and the second sample time T2.

In step b), the CAN controller 228 samples the first bit value 262 of the RXD signal 206. Preferably, the first bit value 262 is the first sampled bit value 262 following the first signal change 218 of the RXD signal 206. The sampling of the first bit value 262 is performed at the first sample time T1. In step c), CAN controller 228 samples the second bit value 264 of RXD signal 206. Sampling of the second bit value 264 is performed at the second sample time T2. Further, the sampling of the second bit value 262 follows the sampling of the first bit value 262. As a result, the first bit value 262 and the second bit value 262 may be referred to as the two bit values 262, 264 following the first signal change 218.

The CAN controller 228 is configured to perform the sampling of the first and second bit values 262, 264 such that the predefined time interval D1 is between the first sample time T1 and the second sample time T2. Preferably, the CAN controller 228 is configured to periodically sample the RXD signal 206, with the predefined reference interval D1 being between each two successive sample times T1, T2. By periodically sampling the RXD signal 206, the CAN controller 228 acquires a sequence of bit values 262, 264, 265, 267, where the first bit value 262 and the second bit value 264 form the first two bit values 262, 264 of the sequence. The sequence may represent the bits of a frame, which shall to be reconstructed.

The CAN controller 228 may be configured to sample the first bit value 262 such that the first sample time T1 is synchronized with the first signal change 218 and/or with the third signal change 232. The second delay time Z2 has been explained previously. The second delay time Z2 is preferably caused by the CAN transceiver 232. The second delay time Z2 may be assumed to be a constant time period. Furthermore, the second delay time Z2 is preferably significantly smaller than the predefined reference time interval D1. In an example, the second delay time T2 is smaller than 10% of the predefined reference time interval D1. Against this background, the CAN controller 228 may be configured to sample the first bit value 262 following the first signal change 218 such that a first time interval V1 is between the first reference time R1 and the first sample time T1. The first time interval V1 may be predefined. The first time interval is between 30% and 90% of the predefined reference time interval D1. As a result, the first time interval V1 is at least 10% smaller than the predefined reference time interval D1, such that even if the second delay time T2 occurs, sampling of the first bit value 262 via the CAN controller 228 is possible if the first bit value 262 is caused by the start frame 284 of the TXD signal 280. The first time interval V1 is at least 30% of the predefined reference time interval D1, such that sampling of the first bit value 262 can be prevented from being performed during a possibly occurring transient phase of the dominant signal level 222.

The CAN controller 228 may be configured to detect a first error, if both of the two bit values 262, 264 following the end of first idle state 216 represent a dominant signal level 222. The first error may be understood as an error in the reconstruction of the bits represented by the RXD signal 206 and/or of the bits of the CAN frame represented by the RXD signal 206.

When the "CAN protocol" is referred to, at least one of the following protocols is meant: Classical CAN, CAN FD and CAN XL. The CAN protocol can also refer to two of the mentioned protocols or to all three of the mentioned protocols.

According to the CAN protocol, the first bit, called the start-of-frame bit or SOF bit, of a CAN frame is a dominant bit. According to the CAN protocol, the SOF bit is followed in the CAN frame by the second bit, which is a bit of an arbitration field of the CAN frame. Basically, according to the CAN protocol, the second bit of the CAN frame can be a dominant bit or a recessive bit. In an example, it is assumed that the second bit of the CAN frame is a recessive bit by definition. This definition may be included in a revision of the CAN protocol. However, it is also possible that the definition applies to the CAN controller 226 and/or the CAN controller module 226. As a result, this definition may be implemented by a CAN controller 228 and/or a CAN controller module 226. In an example, the implementation may be a software implementation, a hardware implementation or a combination thereof. As a result of the implementation, the CAN controller 228 may be configured to generate a TXD signal 280 only such that the TXD signal 280 represents a CAN frame where the first bit (SOF bit) of the CAN frame is a dominant bit and where the second bit (following the SOF bit) of the CAN frame is a recessive bit.

As another result, the first two bits of each CAN frame are predefined as a sequence of a dominant bit and a recessive bit. The analog result is also valid for each CAN frame represented by an RXD signal.

The knowledge that the first two bits of each CAN frame should be formed by a sequence of a dominant bit and a subsequent recessive bit may be used by the CAN controller 228.

In the example of FIG. 6, the first bit value 262 of the RXD signal 206 represents a dominant bit and the subsequent, second bit value 264 of the RXD signal 206 represents a dominant bit. The sequence of two dominant bit values 262, 264 contradicts the previously explained expectation. In this case, a first error is present in the reconstruction of the CAN frame that could or should be represented by the RXD signal after the end of the first idle state 216. The first error is caused by the TXD signal 329 of the third CAN device 106. In this example, it is assumed that each CAN device 102, 106 is formed by a CAN device 202 of FIG. 2. The TXD signal 329 of the third CAN device 106 has a fifth signal change 336 that affects the RXD signal 206 by the fourth delay time Z4 and additionally by the fifth delay time Z5, such that the duration of the dominant signal level 222 of the RXD signal 206 is extended long enough that both the first bit value 262 represents a dominant signal level and the second bit value 264 represents a dominant signal level. As a result, a reconstruction error occurs.

The CAN controller 228, in particular the CAN controller 228 of the CAN controller module 226 of the first CAN device 102, may be configured to cancel a transmission of the TXD signal 280 if the CAN controller 228 detects the first error. The interruption of the transmission of the TXD signal 280 may also be caused by a lost arbitration performed by the CAN controller 228 at an initial phase of sending the TXD signal 280. For example, if the arbitration causes the CAN controller 228 to determine that the second bit 264 of the RXD signal 206 does not correspond to the second bit 286 of the TXD signal, the CAN controller 228 may thereby determine the arbitration to be lost and may stop sending the TXD signal 280 due to the lost arbitration. In an example, the CAN controller module 226, and in particular its CAN controller 228, may be configured to cancel sending the TXD signal 280, if the second bit value 264 of the RXD signal 206 represents a dominant signal level 222.

In an example, the CAN controller module 226, and/or its CAN controller 228, may be configured according to a first configuration K1 or according to a second configuration K2. Each of the first and second configuration K1, K2 may be implemented as software, hardware or a combination thereof in the CAN controller module 226 and/or the CAN controller 228. The CAN controller module 226, and/or its CAN controller 228, may be configured either according to the first configuration K1 or according to the second configuration K2. In another example, both configurations K1, K2 may be (generally) implemented by the CAN controller module 226, and/or its CAN controller 228, wherein the CAN controller module 226, and/or its CAN controller 228, respectively, may be configured to selectively operate either according to the first configuration K1 or according to the second configuration K2. The selection of the configuration K1, K2 can be controlled, for example by a control signal for the CAN controller module 226, and/or for its CAN controller 228, respectively, or by at least one control parameter of the CAN controller module 226, and/or of its CAN controller 228, respectively. The control parameter may be adapted and/or predefined for the CAN controller module 226 and/or the CAN controller 228.

If the CAN controller module 226, and/or its CAN controller 228, is configured according to the first configuration K1, the CAN controller module 226, and/or its CAN controller 228, respectively, may perform the following step as step d): if the second bit value 264 represents a dominant signal level 222, discarding either the first bit value 262 or second bit value 264 so that the remaining, non-discarded bit value (264 or 262) forms a start bit value 266. As a result, if for example the first bit value 262 is discarded, then the remaining second bit value 264 will form the start bit value 266. As a further result, if for example the second bit value 264 is discarded, then the remaining first bit value 262 will form the start bit value 266.

If the CAN controller module 226, and/or its CAN controller 228, is configured according to the second configuration K2, the CAN controller module 226, and/or its CAN controller 228, respectively, may perform the following step as step d): if the second bit value 264 represents a dominant signal level 222, discarding both the first bit value 262 and second bit value 264 and replacing the two discarded bit values 262, 264 by an additionally acquired or predefined start bit value 266 of the RXD signal 206 such that the start bit value 266 represents a dominant signal level 222 and such that a start sample time S1 is assigned to the start bit value 266, which start sample time S1 is arranged between the first sample time T1 and the second sample time T2.

With respect to the example shown in FIG. 6, it was previously explained that initially the first CAN device 102, and in particular the associated CAN controller 228, may begin sending a CAN frame via the TXD signal 280 after the third signal change 332 of the TXD signal 280. The sequence of the first two bits 284, 286 of the CAN frame represented by the TXD signal 280 consists of the dominant bit 284 and the subsequent, recessive bit 286. Somewhat delayed and during the third delay time Z3, the third CAN device 106, and in particular the associated CAN controller, starts sending a (further) CAN frame via the TXD signal 329 after the fifth signal change 336 of the TXD signal 329. The (further) sequence of the first two bits 340, 341 of the (further) CAN frame represented by the TXD signal 329 also comprises a dominant bit 340 and a subsequent, recessive bit 341. The dominant signal level of the TXD signal 280 for the dominant bit 284 and the dominant signal level of the TXD signal 329 for the dominant bit 340 have the consequence that the dominant signal level 222, which follows the first signal change 218 of the RXD signal 206, lasts longer than a predefined reference time interval D1. As a result, the CAN controller module 226 and/or the CAN controller 228 of the first CAN device 102 will sample a first bit value 262 representing a dominant signal level and/or a dominant bit and a second bit value 264 also representing a dominant signal level and/or a dominant bit. As a result, the first error exists because two consecutive bits as the first two bits of a CAN frame oppose the previously explained expectation and/or definition. In an example, the CAN controller 228 of the first CAN device 102 will determine arbitration to be lost such that no further dominant bit is represented by the TXD signal 280 after the second bit 286. The CAN controller of the third CAN device 106, on the other hand, will not detect any lost arbitration, so that the CAN controller of the third CAN device 106 does not interrupt the transmission of the TXD signal 329 representing the (further) CAN frame.

Performing step d) if the CAN controller module 226, and/or the associated CAN controller 228 (for example of the first CAN device 102), is configured according to the configuration K1 offers the advantage that a (further) CAN frame can be reconstructed without errors despite the first error. The technical advantage of being able to reconstruct the frame without errors is explained below with reference to the example shown in FIG. 6.

From FIG. 6 it can be appreciated that the sequence of the sampled bit values 264, 265, 267 of the RXD signal 206 correspond to a sequence of the bits of the (further) CAN frame, which is also represented by the TXD signal 329 of the CAN controller of the third CAN device 106. If the CAN controller 228 of the CAN controller module 226 of the first CAN device 102 is configured according to the configuration K1 and performs step d), the CAN controller 228 (and/or the CAN controller module 226) may discard the first bit value 262. As a result, the CAN controller 228 (and/or the CAN controller module 226) may error-free reconstruct the bits of a (further) CAN frame originally sent by the third CAN device 106 via the TXD signal 329 from the remaining sequence of sampled bit values 264, 265, 267, etc. of the RXD signal 206. The first bit of the CAN frame in this example is formed by the bit represented by the second bit value 264, so that the second bit value 264 of the first RXD signal 206 in this example may be referred to as the start bit value.

It can also be appreciated from FIG. 6 that a composed sequence of the sampled, first bit value 262 of the first RXD signal 206 and the further sampled bit values 265, 267 of the first RXD signal 206 correspond to the sequence of the first bits of the (further) CAN frame represented by the TXD signal 329 of the CAN controller of the third CAN device 106. Instead of the second bit value 264 of the first RXD signal 206, the first bit value 262 of the first RXD signal 206 is considered. If the CAN controller 228 and/or the associated CAN controller module 226 of the first CAN device 102 is configured according to the configuration K1 and performs step d), the CAN controller 228 (and/or the CAN controller module 226) may discard the second bit value 264. As a result, the CAN controller 228 (and/or the CAN controller module 226) may error-free construct the bits of the (further) CAN frame originally sent by the third CAN device 106 via the TXD signal 329 from the composed sequence of sampled bit values 262, 265, 267, etc. of the first RXD signal 206. The first bit of the CAN frame in this example is formed by the bit represented by the first bit value 262, so that the first bit value 262 of the first RXD signal 262 in this example may be referred to as the start bit value. The other bits of the CAN frame may be formed by the bits represented by the bit values 265, 267, etc.

Therefore, by the configuration K1 and performing step d), the error-free reconstruction of the CAN frame will be possible even if the first error occurs.

Alternatively, or in addition to the configuration K1, the CAN controller module 226 and/or the associated CAN controller 228 may be configured according to the configuration K2. In a preferred embodiment of the CAN device 102, 104, 106, 202, the CAN controller module 226 and/or the associated CAN controller 228 is configured either according to the configuration K1 or according to the configuration K2.

Performing step d) if the CAN controller module 226, and/or the associated CAN controller 228 (for example of the first CAN device 102), is configured according to configuration K2 offers the advantage that a (further) CAN frame can be reconstructed without errors despite the first error. The technical advantage of being able to reconstruct the frame without errors is explained below with reference to the example shown in FIG. 7.

Figure 7:
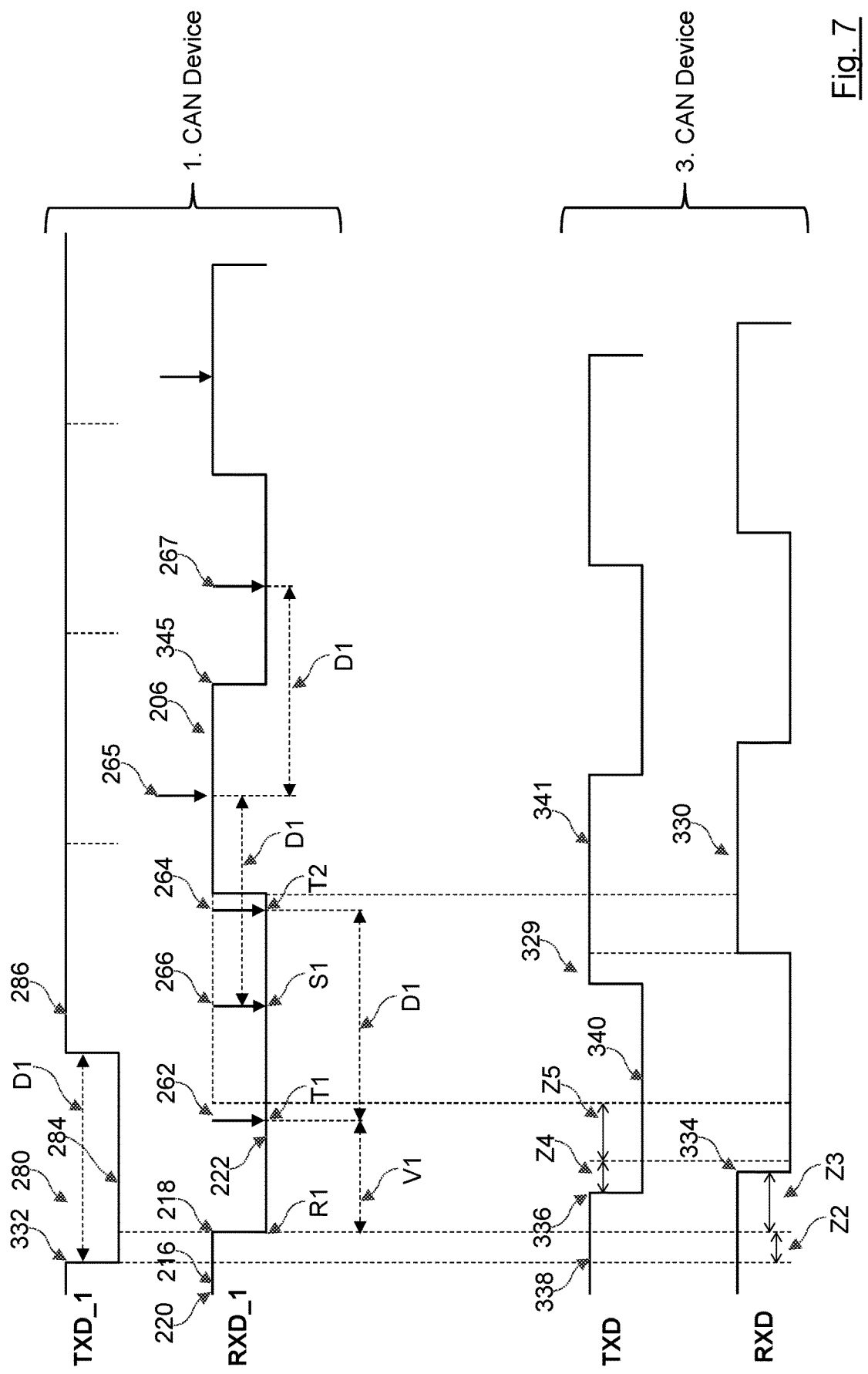

FIG. 7 essentially corresponds to FIG. 6, so that the explanations for FIG. 6 are referred to in an analogous manner. In FIG. 7, in deviation from FIG. 6, a further sample 266 is schematically shown, which is intended to schematically indicate an actual sample 266 of the RXD signal 206 or only a calculated sample 266 of the RXD signal. In FIG. 7, the timing of the following samples 265, 267 are shifted in time with respect to the corresponding representation in FIG. 6.

In connection with FIG. 6 and configuration K1, it was previously explained that either the sequence of sampled bit values 264, 265, 267 etc. of RXD signal 206 or the sequence of sampled bit values 262, 265, 267 etc. of RXD signal 206 are used to perform an error-free reconstruction of the bits of a CAN frame. In connection with FIG. 6, it was further explained that the first bit of the CAN frame may be formed by either a bit represented by the first bit value 262 or a bit represented by the second bit value 264.

By performing step d), if the CAN controller module 226 and/or the associated CAN controller 228 is configured according to configuration K2, both the first sampled bit value 262 and the second sampled bit value 264 are discarded. By discarding both bit values 262, 264, neither bit value 262, 264 is used to form the first bit of the CAN frame to be reconstructed. Instead, the two bit values 262, 264 are replaced by a start bit value 266. In an example, the start bit value 266 is determined by the CAN controller module 226 and/or the associated CAN controller 228. Determining the start bit value 266 may include determining the start bit value 266 such that the start bit value 266 represents a dominant signal level and/or a dominant bit. A start sample time S1 is assigned to the start bit value 266 by the CAN controller module 226 and/or by the associated CAN controller 228. The start sample time S1 is temporally between the first sample time T1 of the second sample time T2. In an example, the CAN controller module 226 and/or the associated CAN controller 228 is configured to determine the start sample time S1 based on the first sample time T1 and the second sample time T2. For example, the start sample time S1 may be determined as an average of the first sample time T1 and the second sample time T2 by the CAN controller module 226 and/or the associated CAN controller 228.

In another example, the CAN controller module 226 and/or the associated CAN controller 228 may be configured to sample another bit value 266 of the RXD signal 206 at a time between the first sample time T1 and the second sample time T2. This sampling may occur in the background, and is usually not used as a relevant sample to determine the first and/or second bit values 262, 264, but may be used to determine a signal change of the RXD signal 206. If the CAN controller module 226 and/or the associated CAN controller 228 is configured according to the configuration K2, a sampling performed in the background during the period between the first sample time T1 and the second sample time T2 may be used by the CAN controller module 226 and/or the associated CAN controller 228 such that this sampling serves to generate the further bit value 266 of the RXD signal 206. The CAN controller module 226 and/or the associated CAN controller 228 may be configured to select, among the samplings performed in the background, the sampling that was performed at the start sampling time S1. As a result, the start bit value 266 may be formed by the sampling of the RXD signal 206 actually executed at the start sample time S1. In this case, the start bit value 266 is also associated with the start sample time S1. The CAN controller module 226 and/or the associated CAN controller 228 may be configured so that the further samples 265, 267 are synchronized with the start sample time S1 of the start bit value 266. For example, the predefined reference time interval D1 may be between the start sample time S1 and the sample time of the sampling 265. The analogous may apply to all further sampling of the RXD signal 206.

It can also be understood from FIG. 7 that a composed sequence of the determined or additionally sampled start bit value 266 of the first RXD signal 206 and the further sampled bit values 265, 267 of the first RXD signal 206 correspond to the sequence of the first bits of the (further) CAN frame represented by the TXD signal 329 of the CAN controller of the third CAN device 106. Instead of the first or second bit value 262, 264 of the first RXD signal 206, said start bit value 266 of the first RXD signal 206 is considered. If the CAN controller 228 and/or the associated CAN controller module 226 of the first CAN device 102 is configured according to the configuration K2 and performs step d), the CAN controller 228 (and/or the CAN controller module 226) may discard the first and second bit values 262, 264, and replace the two discarded bit values 262, 264 with the start bit value 266. As a result, the CAN controller 228 (and/or the CAN controller module 226) can error-free construct, from the composed sequence of the sampled bit values 266, 265, 267, etc. of the first RXD signal 206, the bits of the (further) CAN frame originally sent by the third CAN device 106 via the TXD signal 329. In this example, the first bit of the CAN frame is formed by the bit represented by the start bit value 266. The other bits of the CAN frame may be formed by the bits represented by bit values 265, 267, etc.

Therefore, by the configuration K2 and the performing of step d), the error-free reconstruction of the CAN frame will be possible even if the first error occurs.

The CAN controller module 226, and preferably the associated CAN controller 228, is configured to perform the following step e): Sampling at least one further bit value 265, 267 of the RXD signal 206.

In step e), the CAN controller module 226, and preferably the associated CAN controller 228, may periodically sample that RXD signal 206 to generate the further bit values 256, 267. The sequence of sampling from step e) may follow the sampling of the second bit value 264. Between each two consecutive samplings of the sequence of samplings from step e) may be the predefined reference time interval D1. In an example, the CAN controller module 226, and preferably the associated CAN controller 228, may be configured such that the predefined reference time interval D1 is between the second sample time T2 and the sample time of the first sampling 265 of the sequence of samplings from step e). In another example, the CAN controller module 226, and preferably the associated CAN controller 228, may be configured such that the predefined reference time interval D1 is between the start sample time S1 and the sample time of the first sampling 265 of the sequence of samplings from step e).

The CAN controller module 226, and preferably the associated CAN controller 228, is configured to perform the following step f): generate an RXD frame based on the bit values 262, 264, 266, 265, 267 of the RXD signal, except for the at least one discarded bit value 262, 264. In an example, the CAN controller module 226, and preferably the associated CAN controller 228, is configured to form the RXD frame from the bits represented by the start bit value 266 (for the first bit of the RXD frame) and the sequence of bit values 265, 267 sampled in step e) (in appropriate order for the bits of the frame). The start bit value 266 may represent the start-of-frame bit of the RXD frame.

Previously, it was explained in examples that possibly the first bit value 262, the second bit value 264, or both the first and second bit values 262, 264 may be discarded. In an example, if only the first bit value 262 is discarded, the RXD frame may be generated from a composed series of the bit represented by the second bit value 264 and the bits represented by the further bit values 265, 267 (from step e) in step f). In another example, if only the second bit value 264 is discarded, the RXD frame may be generated from a composed series of the bit represented by the first bit value 262 and the bits represented by the further bit values 265, 267 (from step e) in step f). In another example, if both the first and second bit values 262, 264 are discarded, the RXD frame may be generated from a composed series of the bit represented by the start bit value 266 and the bits represented by the further bit values 265, 267 (from step e) in step f). The start bit value 266 may represent the start-of-frame bit of the RXD frame.

The CAN controller 228 may be configured to generate the RXD frame based on bit values 262-267 of the RXD signal 206 that follow after the first idle state 216 if the first error is not detected. The bit values 262-267 are not limited to the three bit values 262-267 shown in FIG. 6, but may be representative of a plurality of a sequence of bit values following the first idle state 216. As a result, the CAN controller 228 may then generate the RXD frame in step g) if the CAN controller 228 samples a first bit value 262 representing a dominant bit following the first idle state 216 and then samples a second bit value 264 representing a recessive bit. In this case, it is assumed that the first error or corresponding reconstruction error is not present for a reconstruction of a CAN frame that may be represented by the RXD signal 206 following the first idle state 216.

It was previously explained that the RXD signal 206 may be sampled at a higher sampling rate than is used to generate the bit values 262, 264, 265, 267. This sampling may also be referred to as background sampling. In an example, the CAN controller module 226, and in particular the associated CAN controller 228, may be configured to perform the background sampling. Further, the CAN controller module 226, and in particular the associated CAN controller 228, may be configured to detect the first signal change 218 from the recessive signal level 220 of the RXD signal 206 to the dominant signal level 222 of the RXD signal 206 based on the samples from the background sampling. The idle state 216 ends with the first signal change 218 of the RXD signal 206. Against this background, the CAN controller module 226, preferably the associated CAN controller 228, may be configured to detect the end of the idle state 216 by detecting the first signal change 218. Further, the CAN controller module 226, preferably the associated CAN controller 228, may be configured to detect the time of the first signal change 218, in particular based on the samples of the background sampling. The time of the first signal change 218 may be identical to the first reference time R1 of the end of the idle state 216. In an example, the CAN controller module 226, preferably the associated CAN controller 228, may be configured to detect the first reference time R1 of the end of the idle state 216, in particular based on the samples of the background sampling.

If a CAN system 100 has several CAN devices 102, 104, 106 (see FIG. 1), where the CAN devices 102, 104, 106 are not arranged very far from each other, the probability that the first error occurs decreases in principle. However, for the same CAN system 100, the probability may increase the smaller the duration of each bit of a TXD signal 280, 329 is selected or the larger the transmission rate is selected. In an advantageous consideration, the occurrence of the first error may be acceptable if in return a higher transmission rate is achievable by means of the CAN system 100. The first error may be detected and/or handle robustly by the CAN controller module 226, and in particular by the CAN controller 228. From the possibility to detect and/or handle the first error robustly results the advantage that a predefined duration D1 of each bit of a TXD signal, can be reduced, so that a higher transmission rate is achievable with the CAN devices 202, 102, 104, 106 and/or the CAN system 100. Each bit of a TXD signal 280, 329 may have the duration of a reference time interval D1. In light of the foregoing discussion, in an example, the reference time interval D1 may be less than 2 µs. In an example, the reference time interval is between 200 ns and 1500 ns. Due to the short duration of the reference time interval D1 or the short duration of each TXD bit, a particularly high transmission rate can be achieved. At the same time, the CAN devices 102, 104, 106 can be arranged up to 80 meters apart, for example.

In order to comply with the requirements and/or definition explained above, the CAN controller module 226, and in particular the CAN controller 228, may be configured to send a TXD signal 280, 329 representing a TXD frame via the TXD interface 278, wherein the first bit of the TXD frame is a dominant bit and the second bit of the TXD frame is a recessive bit. The technical advantages of this predefined sequence of two predefined bits, which should form the first two bits of each CAN frame, have already been explained in detail before. Reference is made to the corresponding explanations in an analogous manner. In particular, the sequence of two predefined bits allows robust handling of errors while ensuring a high transmission rate.

The CAN controller module 226, and in particular the CAN controller 228, may be configured to confirm the idle state 216 after its detection with each additional sampled bit value of the RXD signal 206 representing the recessive signal level 220. Further, the CAN controller module 226, and in particular the CAN controller 228, may be configured to start sending the TXD signal 280 after a predefined number of further sampled bit values, each representing a recessive signal level 220 of the RXD signal 206, following the detection of the idle state 216, preferably except if a previous attempt to send the TXD signal 218 has been canceled. In case a transmission is initiated, the SOF of the TXD frame shall not be started earlier than a predefined number of bits, also referred to delay bits, after the end of the intermission bits 327, preferably unless the previous arbitration was lost due to skipping a second dominant after the SOF and the ID to be transmitted has had a higher priority than the one that has been received. The delay bits may result in the effect of a "suspend transmission". The delay bits or its corresponding delay time may be calculated e.g. as function of the ID and the number of frames received since last messages transmitted.

The CAN controller module 226, and in particular the CAN controller 228, may be configured, if the second bit value 264 represents a dominant signal level 222 and a third bit value 264 following the second bit value 264 represents a dominant signal level 222, to overwrite the third bit value 265, so that the third bit value 265 represents a recessive signal level 220.

The CAN controller module 226, and in particular the CAN controller 228, may be configured, if the CAN controller module 226 and/or its CAN controller 228 is configured according to the configuration K1, to sample the first bit value 262, the second bit value 264, and the at least one further bit value 265, 267 from step e) such that the predefined reference time interval D1 is provided between each two successive sampling instants of said bit values 262, 264, 265, 267. As a result, the RXD signal 206 is sampled periodically. Preferably, the time intervals D1 are valid even if at least one of the first and second bit values 262, 264 is discarded. Basically, the bit values 262, 264 may be sampled and only afterwards at least one of the bit values 262, 264 may be discarded.

The CAN controller module 226, and in particular the CAN controller 228, may be configured, if the CAN controller module 226 and/or its CAN controller 228 is configured according to the configuration K2, to sample the at least one further bit value 265, 267 of the RXD signal 206 in step e) after the second sample time T2 such that the predefined reference time interval D1 is provided between the start sample time S1 and the sample time of the further bit value 265 following the start bit value 266. As a result, the sample times of the at least one further bit value 265, 267 of the RXD signal 206 may be synchronized to the start sample time S1.

The CAN controller module 226, and in particular the CAN controller 228, may be configured, if the CAN controller module 226 and/or its CAN controller 228 is configured according to the configuration K2, to perform the following sub-steps d1) to d.3) of step d) according to the configuration K2: d.1) detecting a second signal change from the dominant signal level 222 to the recessive signal level 220 represented by the RXD signal 206; d.2) detecting a second reference time of the second signal change; and d.3) assigning the start sample time to the start bit value, such that a second time interval between the start sample time and the second reference time is between 10% and 50% of the predefined reference time interval.

The CAN controller module 226, and in particular the CAN controller 228, may be configured, if the second bit value 264 represents a dominant signal level 222, to perform the following steps e.1) to e.2): e.1) after step e), detecting a third signal change from the recessive signal level 220 to the dominant signal level 222 represented by the RXD signal 206; e.2) detecting a third reference time of the third signal change 345; and e.3) sampling at least one further bit value 267 of the RXD signal 206 after the third signal change; wherein a third time interval between the third reference time and the sampling time of the sampling of a bit value 267 following the third signal change is between 30% and 90% of the predefined reference time interval D1; and wherein the predefined reference time interval D1 is provided between each two successive sampling instants of step e.3).

Figure 8:
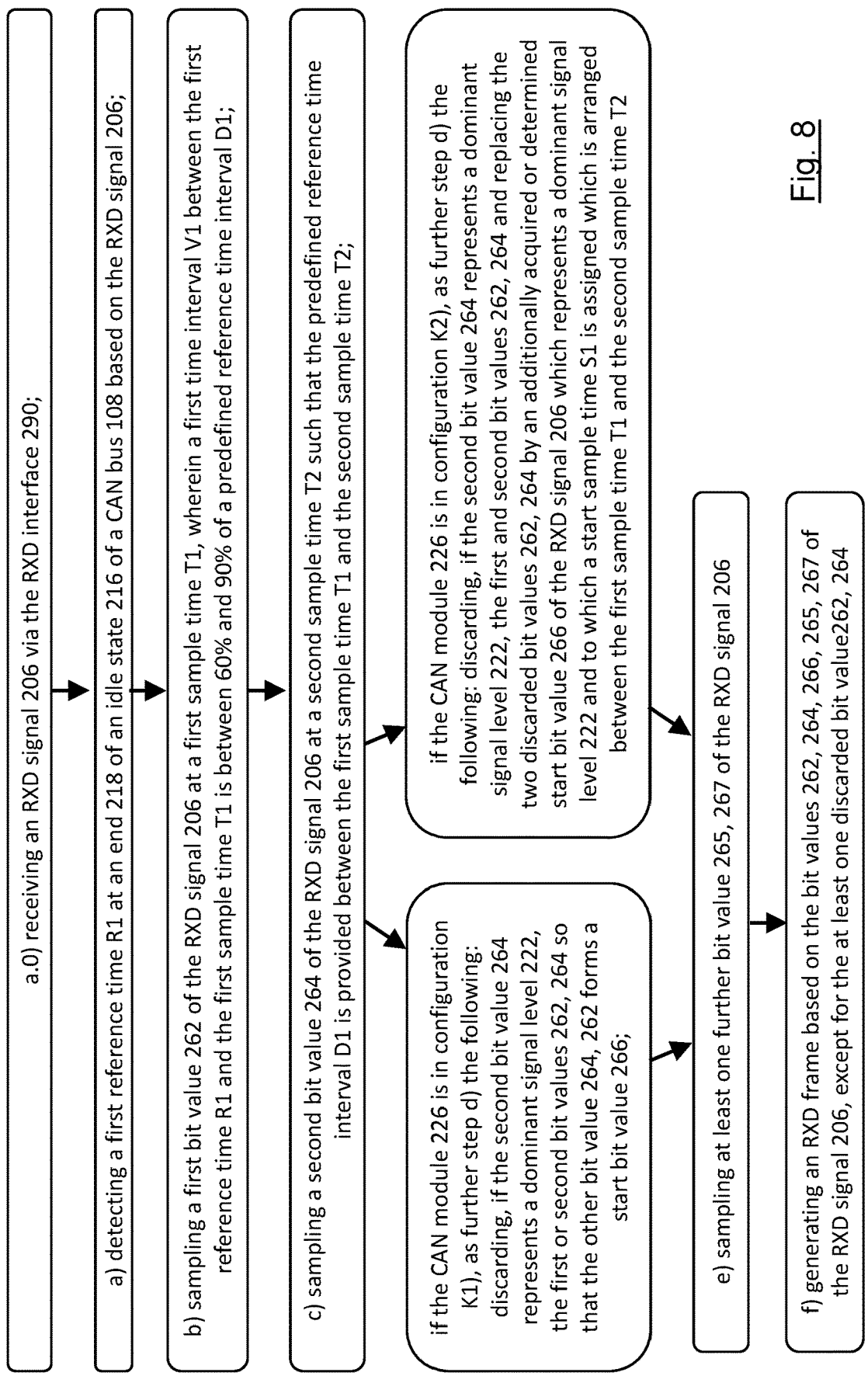
FIG. 8 shows a simplified flow chart of an embodiment of the method.

FIG. 8 schematically illustrates an example of a flowchart of an embodiment of a method for the CAN controller module 226, which comprises the TXD interface 292, the RXD interface 294, the CAN controller 228 coupled to both, the TXD interface 292 and the RXD interface 294, wherein the method comprising the following steps a.0) to c):

a.0) receiving an RXD signal 206 via the RXD interface 294;
a) detecting a first reference time R1 at an end 218 of an idle state 216 of a CAN bus 108 based on the RXD signal 206;
b) sampling a first bit value 262 of the RXD signal 206 at a first sample time T1, wherein a first time interval V1 between the first reference time R1 and the first sample time T1 is between 60% and 90% of a predefined reference time interval D1;
c) sampling a second bit value 264 of the RXD signal 206 at a second sample time T2 such that the predefined reference time interval D1 is provided between the first sample time T1 and the second sample time T2;
wherein the CAN controller module 226 is further configured according to one of two configurations K1) or K2),
wherein the method comprising, if the CAN controller module 226 is in configuration K1), as further step d) the following: discarding, if the second bit value 264 represents a dominant signal level 222, the first or second bit values 262, 264 so that the other bit value 264, 262 forms a start bit value 266; wherein the method comprising, if the CAN controller module 226 is in configuration K2), as further step d) the following: discarding, if the second bit value 264 represents a dominant signal level 222, the first and second bit values 262, 264 and replacing the two discarded bit values 262, 264 by an additionally acquired or determined start bit value 266 of the RXD signal 206 which represents a dominant signal level 222 and to which a start sample time S1 is assigned which is arranged between the first sample time T1 and the second sample time T2;
wherein the method comprising the further steps e) to f):
e) sampling at least one further bit value 265, 267 of the RXD signal 206; and
f) generating an RXD frame based on the bit values 262, 264, 266, 265, 267 of the RXD signal 206, except for the at least one discarded bit value 262, 264.

Although the described exemplary embodiments disclosed herein focus on devices, systems, and methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first", "second", etc. are used to arbitrarily distinguish between the elements such terms describe. Thus, these terms are not necessarily intended to indicate temporal or other prioritization of such elements.

The invention claimed is:

1. A Controller Area Network, CAN, device, comprising:
a transmit data, TXD, interface, for sending a TXD signal,
a receive data, RXD, interface, for receiving an RXD signal,
a CAN controller coupled to both, the TXD interface and the RXD interface,
wherein the CAN device is configured to perform the following steps:
 detect a first reference time at an end of an idle state of a CAN bus based on the RXD signal;
 sample a first bit value of the RXD signal at a first sample time, wherein a first time interval between the first reference time and the first sample time is between 30% and 90% of a predefined reference time interval; and
 sample a second bit value of the RXD signal at a second sample time such that the predefined reference time interval is provided between the first sample time and the second sample time;
wherein the CAN device is further configured according to one of the two following configurations:
 in a first configuration, if the second bit value represents a dominant signal level, discarding the first or second bit value so that the remaining, non-discarded bit value forms a start bit value; or
 in a second configuration, if the second bit value represents a dominant signal level, discarding the first and second bit values and replacing the discarded first and second bit values by an additionally acquired or determined start bit value of the RXD signal which represents a dominant signal level and to which a start sample time is assigned which is arranged between the first sample time and the second sample time; and
wherein the CAN device is further configured to perform the following steps:
 sample at least a third bit value of the RXD signal; and
 generate an RXD frame based on the bit values of the RXD signal, except for at least one discarded bit value of the first and second bit values.

2. The CAN device of claim 1, wherein the CAN device is further configured to perform the following steps:
periodically sample the RXD signal; and
detect an idle state of the CAN bus by detecting at least eleven consecutive sampled bit values each representing a recessive signal level of the RXD signal.

3. The CAN device of claim 2, wherein the CAN device is further configured to perform the following steps:
at the end of the idle state, detect a first signal change from a recessive signal level to a dominant signal level represented by the RXD signal; and
detect the first reference time of the end of the idle state.

4. The CAN device of claim 1, wherein the CAN device is further configured to interpret the start bit value as a representation of a first bit, SOF, of the RXD frame.

5. The CAN device of claim 1, wherein the predefined reference time interval is less than two microseconds.

6. The CAN device of claim 5, wherein the predefined reference time interval is between 200 nanoseconds and 1500 nanoseconds.

7. The CAN device of claim 1, wherein the CAN device is further configured to send a TXD signal representing a TXD frame via the TXD interface, wherein the first bit of the TXD frame is a dominant bit and the second bit of the TXD frame is a recessive bit.

8. The CAN device of claim 7, wherein the CAN device is further configured to cancel sending the TXD signal if the second bit value of the RXD signal has a dominant signal level.

9. The CAN device of claim 8, wherein the CAN device is further configured to perform the following steps:
at the end of the idle state, detect a first signal change from a recessive signal level to a dominant signal level represented by the RXD signal; and
detect the first reference time of the end of the idle state;
confirm the idle state after its detection with each additional sampled bit value of the RXD signal representing the recessive signal level; and
start sending the TXD signal after a predefined number of further sampled bit values, each representing a recessive signal level of the RXD signal, following the detection of the idle state, except if a previous attempt to send the TXD signal has been canceled.

10. The CAN device claim 1, wherein the CAN device is further configured, if the second bit value represents a dominant signal level and a third bit value of a sampling following the sampling of the second bit value represents a dominant signal level, to overwrite the third bit value, if the third bit value was detected as representing signal value, so that the third bit value represents a recessive signal level.

11. The CAN device of claim 1, wherein the CAN device is further configured, in the first configuration, to sample the first bit value, the second bit value, and at least the third bit value such that the predefined reference time interval is provided between each two successive sampling instants of said bit values.

12. The CAN device of claim 1, wherein the CAN device is further configured, in the second configuration, to sample the third bit value of the RXD signal after the second sample time such that the predefined reference time interval is provided between the start sample time and the sample time of the third bit value following the start bit value.

13. The CAN device of claim 3, wherein the CAN device is further configured to perform the following steps in the second configuration:
detect a second signal change from the dominant signal level to the recessive signal level represented by the RXD signal;
detect a second reference time of the second signal change; and
assign the start sample time to the start bit value, such that a second time interval between the start sample time and the second reference time is between 10% and 50% of the predefined reference time interval.

14. The CAN device of claim 13, wherein the CAN device is further configured, if the second bit value represents a dominant signal level, to perform the following steps:
after sampling the third bit value of the RXD signal, detecting a third signal change from the recessive signal level to the dominant signal level represented by the RXD signal;
detecting a third reference time of the third signal change; and
sampling at least one third bit value of the RXD signal after the third signal change;
wherein a third time interval between the third reference time and the sampling time of the sampling of a bit value following the third signal change is between 30% and 90% of the predefined reference time interval; and
wherein the predefined reference time interval is provided between each two successive sampling instants when sampling the third bit value of the RXD signal after the third signal change.

15. A Method for a Controller Area Network, CAN, device, which comprises a transmit data, TXD, interface, a receive data, RXD, interface, a CAN controller coupled to both, the TXD interface and the RXD interface, wherein the method comprising the following steps:
receiving an RXD signal via the RXD interface;
detecting a first reference time at an end of an idle state of a CAN bus based on the RXD signal;
sampling a first bit value of the RXD signal at a first sample time, wherein a first time interval between the first reference time and the first sample time is between 60% and 90% of a predefined reference time interval; and
sampling a second bit value of the RXD signal at a second sample time such that the predefined reference time interval is provided between the first sample time and the second sample time;
wherein the CAN device is further configured according to one of the following configurations:
in a first configuration, discarding, if the second bit value represents a dominant signal level, the first or second bit values so that the other bit value forms a start bit value; or
in a second configuration, discarding, if the second bit value represents a dominant signal level, the first and second bit values and replacing the discarded first and second bit values by an additionally acquired or determined start bit value of the RXD signal which represents a dominant signal level and to which a start sample time is assigned which is arranged between the first sample time and the second sample time; and
wherein the method comprises the further steps of:
sampling at least a third bit value of the RXD signal; and
generating an RXD frame based on the bit values of the RXD signal, except for at least one discarded bit value of the first and second bit values.

16. The method of claim 15, wherein detecting the first reference time comprises the following steps:
periodically sampling the RXD signal; and
detecting an idle state of the CAN bus by detecting at least eleven consecutive sampled bit values each representing a recessive signal level of the RXD signal.

17. The method of claim 16, wherein detecting the first reference time further comprises the following steps:
at the end of the idle state, detecting a first signal change from a recessive signal level to a dominant signal level represented by the RXD signal; and
detecting the first reference time of the end of the idle state.

18. The method of claim 15, wherein the method further comprises the following step:
sending, by the CAN device, a TXD signal representing a TXD frame via the TXD interface, wherein the first bit of the TXD frame is a dominant bit and the second bit of the TXD frame is a recessive bit.

19. The method of claim 18, wherein the method further comprises the following step:

cancelling, by the CAN device, the sending the TXD signal if the second bit value of the RXD signal has a dominant signal level.

20. The method of claim 16, wherein detecting the first reference time further comprises the following steps:
at the end of the idle state, detecting, by the CAN device, a first signal change from a recessive signal level to a dominant signal level represented by the RXD signal; and
detecting, by the CAN device, the first reference time of the end of the idle state; and
wherein the method further comprises the following steps:
confirming, by the CAN device, the idle state after its detection with each additional sampled bit value of the RXD signal representing the recessive signal level; and
initiating, by the CAN device, sending of the TXD signal after a predefined number of further sampled bit values, each representing a recessive signal level of the RXD signal, following the detection of the idle state, except if a previous attempt to send the TXD signal has been canceled.

* * * * *